April 22, 1930.　　D. M. SOLENBERGER　　1,755,673
PISTON RING
Filed March 1, 1926　　2 Sheets-Sheet 1
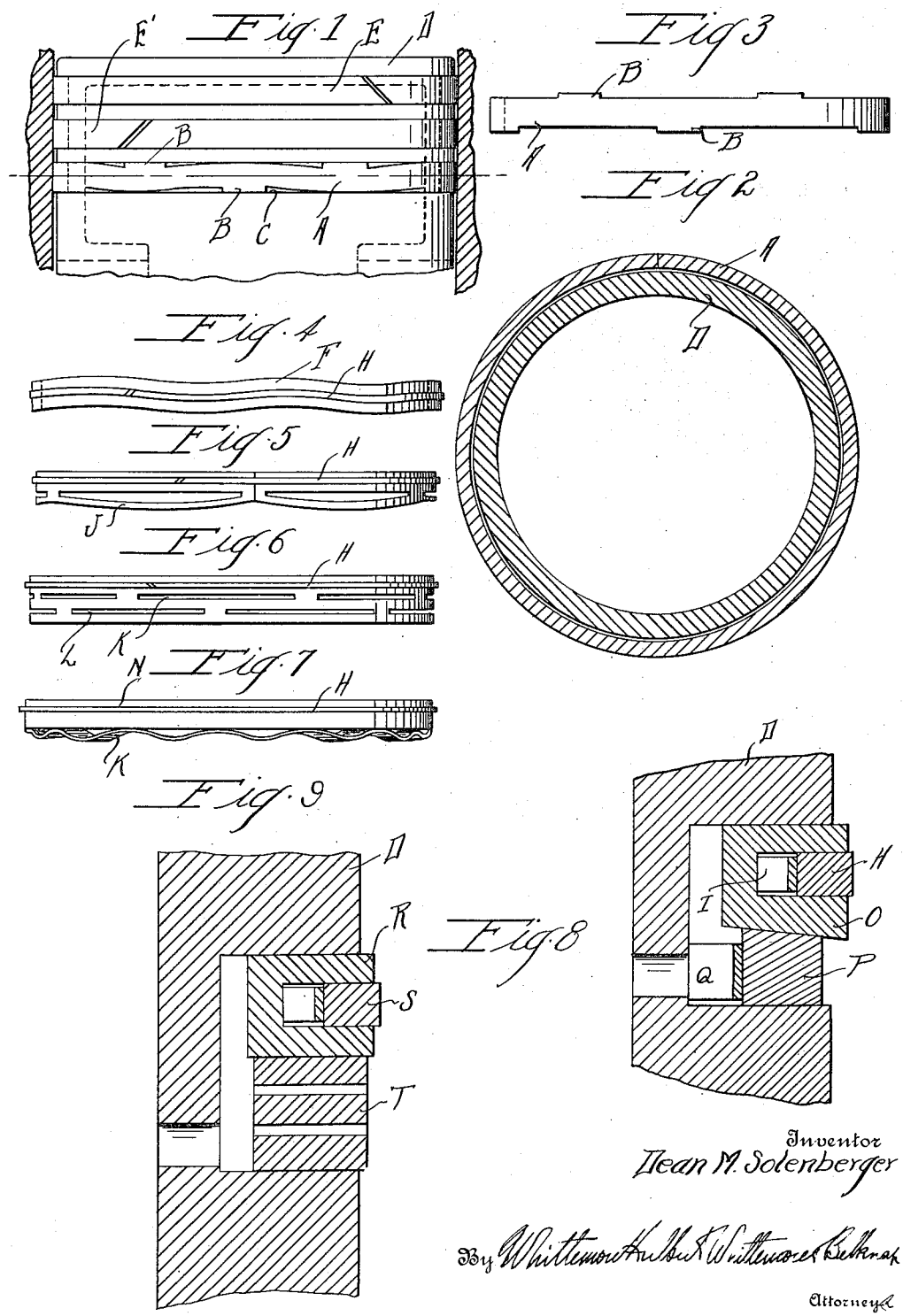
Inventor
Dean M. Solenberger

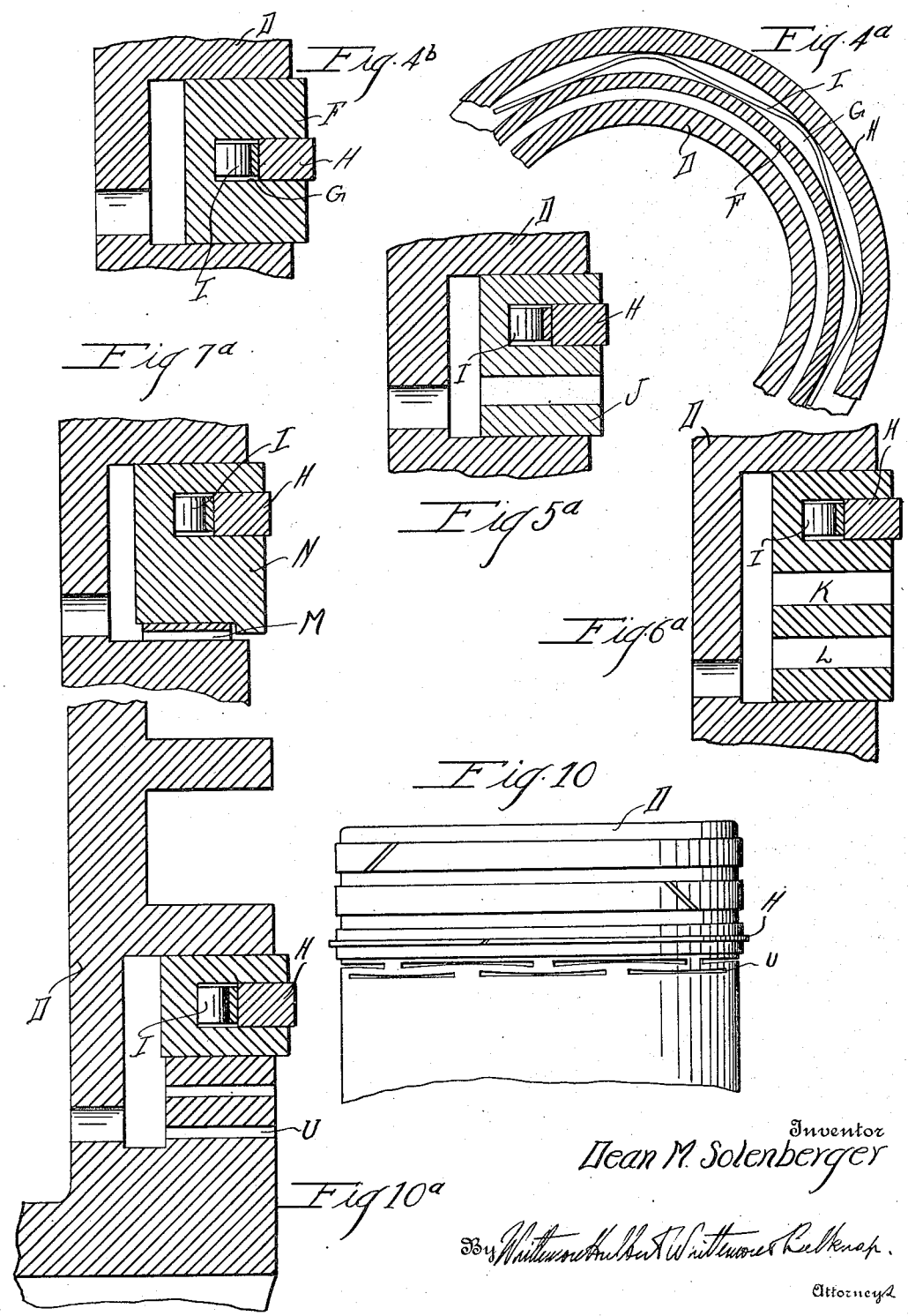

Patented Apr. 22, 1930

1,755,673

UNITED STATES PATENT OFFICE

DEAN M. SOLENBERGER, OF KANSAS CITY, MISSOURI, ASSIGNOR TO SIMPLEX PISTON RING COMPANY, OF CLEVELAND, OHIO, A CORPORATION OF OHIO

PISTON RING

Application filed March 1, 1926. Serial No. 91,600.

The invention relates to piston rings and more particularly to rings designed for use in connection with loose-fitting pistons to eliminate piston slap. To this end the invention consists in the novel construction as hereinafter set forth.

In the drawings:

Figure 1 is a sectional elevation through a piston and cylinder showing one form of my improved ring applied thereto.

Figure 2 is a cross section on line 2—2 of Figure 1.

Figure 3 is a side elevation of the ring detached.

Figures 4, 5, 6, and 7 are similar view showing modified constructions of the ring.

Figures 4ª and 4ᵇ are respectively a horizontal section and vertical cross section of the construction shown in Figure 4.

Figure 5ª, Figure 6ª, and Figure 7ª are enlarged vertical cross sections corresponding respectively to Figures 5, 6 and 7.

Figure 8 and Figure 9 are enlarged vertical cross sections through still other modifications.

Figure 10 is an elevation of a piston and ring showing another modification and

Figure 10ª is an enlarged vertical cross section thereof.

Piston rings as commonly used are designed to effect a seal between the piston and cylinder. With certain constructions used under certain conditions, the ring may also serve to retard the movement of the loose-fitting piston from one side to the other of the cylinder thereby lessening piston slap. The two functions are, however, divergent and to secure the one, the effectiveness of the other is usually lessened. This is for the reason that to produce the most perfect sealing effect the ring should be free to expand, contract or distort in conformity to the surface of the cylinder and should therefore be freely movable within the ring groove of the piston. On the other hand to prevent piston slap the ring must resist the movement of the piston relative thereto so as to retard its velocity in passing from one side of the cylinder to the other. This obviously interferes with the sealing function.

My invention consists essentially in separating these two functions so that neither one will interfere with the other. It further consists in the means employed for absorbing the energy of movement so as to limit acceleration.

As shown specifically in Figures 1 to 3 a ring A is formed with projections B upon opposite sides thereof staggered in relation to each other. The total width between the planes of the opposite projections is somewhat greater than the width of the ring groove C in the piston D so that when the ring is engaged with said groove, it will be sprung as shown in Figure 1. This will exert a relatively high pressure on the sides of the groove which will frictionally resist movement of the piston relative to the ring. The ring A is also non-contractible having either a continuous annulus or, where split as shown in Figure 2, fitted to approximately the diameter of the cylinder. Thus, in operation, the lateral thrust on the piston which would tend to move it from one side of the cylinder to the other, is resisted by the high friction between the ring and ring groove. This friction is not sufficient to lock these parts from relative movement but it will retard acceleration so that the velocity attained is insufficient to produce an objectionable slap. The energy of movement is also frictionally absorbed instead of being stored for a recoil as would be the case if movement were resisted by a spring.

With the construction thus far described, the ring A functions solely to prevent slap and not to form an effective seal. Sealing of the piston may, however, be accomplished by additional rings freely movable in their ring grooves as indicated at E and E' Figure 1.

In Figure 4 I have illustrated a construction of ring combining the functions of sealing and preventing piston slap but without interference with each other. This, as more clearly shown in the large cross section Figure 4ᵇ, comprises a ring F either of the construction shown in Figure 3 or of a wavy outline as shown in Figure 4 to develop a high wall friction in the ring groove. The ring F is further provided with a central groove G within which is placed a sealing ring H. This ring may be pressed outward either by its own tension or by that of the corrugated expander I and, as the friction on the sides of the groove is quite limited, the ring will be free to conform to the walls of the cylinder and to produce sealing.

In Figures 5 and 5ª the required pressure on the walls of the piston ring is developed by laterally deflected resilient portions J. These may be formed by first cutting segmental slots in the ring and then deflecting the portion on the outside of said slots laterally outward to increase the total width to more than that of the ring groove. In Figure 6 the resilient pressure is developed by cutting a total series of slots in staggered relation to each other as indicated at K and L.

Figure 7 shows still another construction in which a resilient corrugated ring M is placed between the ring N and one side of the ring groove.

In Figure 8 the ring O is of wedge-shaped cross section and an oppositely tapering ring P placed adjacent thereto is forced outward by the corrugated expander Q. This will develop a very high pressure of the walls of the ring groove even where an expander of light tension is employed.

Figure 9 shows a construction similar to Figure 6 but with the portion of the ring R containing the compensating or sealing ring S separate from the staggered slotted portion of the ring T.

Figures 10 and 10ª are similar with the exception that the staggered slotted portion U is integral with the piston.

All of the constructions above described and illustrated are basically the same in that a high pressure is developed between one ring and the wall of the ring groove therefor in the piston while the sealing is accomplished by a separate and freely movable ring. This high wall pressure produces sufficient friction to dampen the relative movement of said ring and piston absorbing the energy and preventing slap.

What I claim as my invention is:

1. The combination with a cylinder and a piston loosely fitting the same provided with a ring groove, of a ring in said groove and resilient axially expansible means for developing a predetermined friction between said ring and a wall of the groove sufficient to retard transverse movement of the piston under lateral thrust due to connecting rod angularity to substantially eliminate audible contact with the cylinder wall.

2. The combination with a cylinder and a piston loosely fitting the same and provided with a ring groove, of a ring in said groove and resilient axially expansible means for developing a predetermined friction between said ring and a wall of the groove sufficiently retarding transverse movement of the piston under lateral thrust due to connecting rod angularity and with either high internal gas pressure or excessive piston clearance to substantially eliminate audible contact with the cylinder wall.

3. The combination with a cylinder and a piston loosely fitting the same provided with a ring groove, of a ring unit engaging said groove and including a portion movable radially to maintain peripheral sealing contact with the cylinder wall and axially resilient means for developing a predetermined friction between said ring and the groove wall permitting relative movement thereof but sufficiently retarding transverse movement of the piston under lateral thrust due to connecting rod angularity to substantially eliminate audible contact with the cylinder wall.

4. The combination with a cylinder and a piston loosely fitting the same provided with a ring groove, of a ring unit engaging said groove and including a portion movable radially to maintain peripheral sealing contact with the cylinder wall and an axially resilient portion for developing a predetermined friction between said ring and a side wall of the groove permitting relative movement thereof but sufficiently retarding transverse movement of the piston under lateral thrust due to connecting rod angularity to substantially eliminate audible contact with the cylinder wall.

5. The combination with a cylinder and a piston loosely fitting the same provided with a ring groove, of a ring for engaging said groove having a total axial dimension in excess of the axial dimension of said groove but with the axial dimension of no portion of the cross section of said ring in excess of that of the ring groove, said ring when placed in said groove being flexed to exert a predetermined axial pressure to develop a predetermined friction with the wall of the ring groove sufficiently retarding transverse movement of the piston under lateral thrust due to connecting rod angularity to substantially eliminate audible contact with the cylinder wall.

6. The combination with a cylinder and a piston loosely fitting the same provided with a ring groove, of a ring for engaging said groove having a cross section of no greater axial dimension than that of the groove, said ring being warped, whereby when inserted in said groove there is developed a predetermined friction with the wall of the groove sufficiently retarding transverse movement of the piston under lateral thrust due to connecting rod angularity to substantially eliminate audible contact with the cylinder wall.

7. The combination with a cylinder and a piston loosely fitting the same provided with a ring groove, of a ring in said groove no cross section of which has a greater axial dimension than that of the groove, said ring having, however, oppositely projecting staggered portions the limit planes of which are spaced by a dimension in excess of the axial dimension of said ring groove, whereby said staggered portions are pressed against the sides of the groove with a predetermined axial pressure for developing a predetermined friction sufficient to retard transverse movement of the piston under lateral thrust due to connecting rod angularity so as to substantially eliminate audible contact with the cylinder wall.

In testimony whereof I affix my signature.

DEAN M. SOLENBERGER.